United States Patent Office 3,290,342
Patented Dec. 6, 1966

3,290,342
ORGANOPHOSPHORUS-VANADIUM COMPOUNDS AND METHODS FOR PREPARING AND USING THE SAME
Charles J. Stern, Jr., Westfield, and Edward G. Budnick, Scotch Plains, N.J., assignors to Plains Chemical Development Co., Garwood, N.J., a corporation of New Jersey
No Drawing. Filed Aug. 18, 1961, Ser. No. 132,292
26 Claims. (Cl. 260—429)

This invention relates to novel organometallic compounds and their employment as fuel additives. More particularly, the present invention relates to novel organic compounds containing vanadium and phosphorus and their use in enhancing the effectiveness of fuels employed in internal combustion engines and the like.

The conventional fuels employed heretofore have been known to undergo imperfect combustion resulting in the emission of unburned hydrocarbons which contribute substantially to air pollution particularly in large metropolitan environments, and thus constitute a serious public health hazard. Such emissions of hydrocarbons are, in addition, essentially uneconomic.

Accordingly, it is an objective of the present invention to provide novel, stable, hydrocarbon-soluble organophosphorus-vanadium compounds which constitute economic fuel additives improving both the rate and equilibrium constant of the oxidation reaction occurring within the combustion chamber, wherein hydrocarbon fuels are employed.

The novel additives of the present invention possessing these characteristics as well as other advantages which will be described hereinafter are represented by the following general formulae:

(I) $\quad (VO)_q Y_d Z_{(3-d)}$ and (II) $\quad V(X)_n (Z)_k$ wherein Y is a halogen substituent or a hydroxide or sulfate moiety; X is a halogen, phosphate or nitrate substituent; Z is a hydrocarbyl phosphonate, a hydrocarbyl phosphinate or a hydrocarbyl phosphate radical, or a halogen or hydroxy substituted hydrocarbyl derivative of said phosphonate, phosphinate, or phosphate; $d$ is a value from 0 to 2 inclusive; $q$ is an integer from 1 to 2 provided that $d$ has a value of zero when $q$ has a value of 2; $n$ is an integer of from 1 to 4; and $k$ is an integer of from 1 to 3. The term "hydrocarbyl" is intended to encompass monovalent hydrocarbon radicals, e.g. alkyl, aryl, and cycloalkyl.

The compounds of the general Formula I are prepared by the reaction of an organophosphorus compound, that is a phosphoric acid, phosphonic acid or phosphinic acid or an ester or oxide thereof of the formulae:

$$(RO)_2 \overset{O}{\underset{\|}{P}} OH, \quad R(RO)\overset{O}{\underset{\|}{P}} OH$$

or $$R_2 \overset{O}{\underset{\|}{P}} OH$$

or mixtures thereof, wherein R is hydrogen or a hydrocarbyl or halogen- or hydroxy-substituted hydrocarbyl radical, and preferably an alkyl substituent containing from 1 to 16 carbon atoms; provided that in each of the aforesaid formulae one of the substituents represented by R is a hydrocarbyl or substituted hydrocarbyl radical; with an inorganic vanadium-containing compound of the formulae:

$$VO(Y)_n, \quad V_2(O)_p$$

and $$M_3 VO_4$$

wherein each of Y and $n$ has the value assigned thereto above; M is ammonium, an alkali metal, such as for example, sodium or potassium, or an alkaline earth metal such as calcium; and $p$ is an integer from 2 to 5 inclusive.

By reaction of one of the aforesaid organophosphorus compounds or mixtures thereof with an inorganic vanadium-containing compound of the formula, $VX_m$ wherein X has the value described above and $m$ is an integer from 2 to 4 inclusive; there is formed compounds of general Formula II above.

Encompassed within the general Formulae I and II above are novel compounds of the following classes:

Vanadium pentoxide-alkyl phosphonic acid reaction products of the formulae:

$$R'\!-\!\overset{O}{\underset{\|}{P}}\diagdown_{O}\diagup^{O}\overset{O}{\underset{\|}{V}}\!-\!O\!-\!\overset{O}{\underset{\underset{OR'}{|}}{P}}\!-\!R'$$

$$R'\!-\!\overset{O}{\underset{\|}{P}}\diagdown_{O}\diagup^{O}\overset{O}{\underset{\|}{V}}\!-\!O\!-\!\overset{O}{\underset{\underset{R'}{|}}{P}}\!-\!O\!-\!\overset{O}{\underset{\|}{V}}\diagdown_{O}\diagup^{O}\overset{O}{\underset{\|}{P}}\!-\!R'$$

and $$[R'\!-\!\overset{O}{\underset{\underset{R'}{\overset{|}{O}}}{\overset{\|}{P}}}\!-\!O\!-\!]_3 V$$

wherein R' is an alkyl radical containing preferably from 1 to 16 carbon atoms;

Vanadium pentoxide-hydroxyalkyl phosphinate reaction products of the formula:

$$[(HOR')_2\!-\!\overset{O}{\underset{\|}{P}}\!-\!O\!-\!]_r V[\!-\!O\!-\!\overset{O}{\underset{\underset{H}{|}}{\overset{\|}{P}}}\!-\!R'OH]_{3-r}$$

wherein $r$ has a value of from 0 to 3;

Vanadium pentoxide mono and dialkyl phosphate reaction products of the formulae:

$$\left[ R'O\!-\!\overset{O}{\underset{\|}{P}}\diagdown_{O-}^{O-}\right]_3 \left[\overset{O}{\underset{\|}{V}}\right]_2$$

$$\left[(R'O)_2\!-\!\overset{O}{\underset{\|}{P}}\!-\!O\!-\!\right]_3 \overset{O}{\underset{\|}{V}}$$

$$R'O\!-\!\overset{O}{\underset{\|}{P}}\diagdown_{O}\diagup^{O}\overset{O}{\underset{\|}{V}}\!-\!O\!-\!\overset{O}{\underset{\|}{P}}\!-\!(OR)_2$$

Coordination compounds of vanadium halides, for example, vanadium chlorides, with organophosphorus acids, esters and oxides:

$$VCl_3 \cdot \left( HO\overset{O}{\underset{\|}{\overset{\diagup}{P}}}\diagdown^{OR'}_{OR}\right)_q$$

$$VCl_3 \cdot [O\!=\!P(OR')_3]_q$$

$$VCl_3 \cdot [HO\!-\!\overset{O}{\underset{\|}{P}}\!-\!R_2']_q$$

wherein $q$ has a value of 1 to 2; and $$VCl_2 {:} [HO\!-\!\overset{O}{\underset{\|}{P}}\!-\!(OR')_2]_k$$

$$VCl_2 {:} \left[\overset{O}{\underset{\|}{P}}(OR')_3\right]_k$$

$$VCl_2 {:} [HO\!-\!\overset{O}{\underset{\|}{P}}\!-\!R_2']_k$$

wherein $k$ has a value of from 1 to 3 inclusive, as assigned above; and wherein each of the above recited groups of coordination compounds R' has the value described hereinabove.

Illustrative of the organophosphorus reactants which may be employed in the practice of the invention are alkyl phosphates, alkyl phosphonic acids and esters, and alkyl phosphinic acids and esters, such as for example: monobutyl phosphate, monoamyl phosphate, monohexyl phosphate, monoheptyl phosphate, monooctyl phosphate, monononyl phosphate, monodecyl phosphate, monoundecyl phosphate, monododecyl phosphate, monotridecyl phosphate, monomyristyl phosphate, monocetyl phosphate, monostearyl phosphate, monocyclohexyl phosphate, monobenzyl phosphate, dibutyl phosphate, diamyl phosphate, dihexyl phosphate, diheptyl phosphate, dioctyl phosphate, dinonyl phosphate, didecyl phosphate, diundecyl phosphate, didodecyl phosphate, dietridecyl phosphate ,ditridecyl phosphate, dimyristyl phosphate, dicetyl phosphate, distearyl phosphate, dicyclohexyl phosphate, dibenzyl phosphate, pentyl phosphonic acid and its mono esters, hexyl phosphonic acid and its mono esters, heptyl phosphonic acid and its mono esters, octyl phosphonic acid and its mono esters, nonyl phosphonic acid and its mono esters, decyl phosphonic acid and its mono esters, undecyl phosphonic acid and its mono esters, dodecyl phosphonic acid and its mono esters, tridecyl phosphonic acid and its mono esters, tetradecyl phosphonic acid and its mono esters, pentadecyl phosphonic acid and its mono esters, hexadecyl phosphonic acid and its mono esters, heptadecyl phosphonic acid and its mono esters, octadecyl phosphonic acid and its mono esters, nonadecyl phosphonic acid and its mono esters, eicosanyl phosphonic acid and its mono esters, heneicosanyl phosphonic acid and its mono esters, docosanyl phosphonic acid and its mono esters, benzyl phosphonic acid and its mono esters, cyclohexyl phosphonic acid and its mono esters, dibutyl phosphinic acid, diamyl phosphinic acid, dihexyl phosphinic acid, diheptyl phosphinic acid, dioctyl phosphinic acid, dinonyl phosphinic acid, didecyl phosphinic acid, diundecyl phosphinic acid, didodecyl phosphinic acid, ditridecyl phosphinic acid, ditetradecyl phosphinic acid, dipentadecyl phosphinic acid, dihexadecyl phosphinic acid, dioctadecyl phosphinic acid, dihexadecyl phosphinic acid, dioctadecyl phosphinic acid, dicyclohexyl phosphinic acid, dibenzyl phosphinic acid, di(alpha-hydroxybutyl) phosphinic acid,
di(alpha-hydroxypentyl) phosphinic acid,
di(alpha-hydroxyhexyl) phosphinic acid,
di(alpha-hydroxyheptyl) phosphinic acid,
di(alpha-hydroxyoctyl) phosphinic acid,
di(alpha-hydroxynonyl) phosphinic acid,
di(alpha-hydroxydecyl) phosphinic acid,
di(alpha-hydroxydodecyl) phosphinic acid,
di(alpha-hydroxytridecyl) phosphinic acid,
di(alpha-hydroxytetradecyl) phosphinic acid,
di(alpha-hydroxypentadecyl) phosphinic acid,
di(alpha-chlorobutyl) phosphinic acid,
di(alpha-chloropentyl) phosphinic acid,
di(alpha-chlorohexyl) phosphinic acid,
di(alpha-chlorooctyl) phosphinic acid,
di(alpha-chloroheptyl) phosphinic acid,
di(alpha-chlorononyl) phosphinic acid,
di(alpha-chlorodecyl) phosphinic acid,
di(alpha-chlorododecyl) phosphinic acid,
di(alpha-chlorotridecyl) phosphinic acid,
di(alpha-bromobutyl) phosphinic acid,
di(alpha-bromopentyl) phosphinic acid,
di(alpha-bromohexyl) phosphinic acid,
di(alpha-bromoheptyl) phosphinic acid,
di(alpha-bromooctyl) phosphinic acid,
di(alpha-bromononyl) phosphinic acid, and
di(alpha-bromodecyl) phosphinic acid, as well as mixture of two or more thereof.

The vanadium-containing components for use in preparing the compounds of the instant invention by reaction with the aforesaid phosphorus-containing compounds are the vanadium oxides, vanadium halides, vanadium oxyhalides, and vandates of ammonium, alkali metals, and alkaline earth metals and related compounds of which the following are illustrative: vanadium tribromide, vanadium chloride, vanadium dichloride, vanadium tetrachloride, vanadium triiodide, vanadium trifluoride, vanadium oxybromide, vanadium oxydibromide, vanadium oxytribromide, vanadium oxychloride, vanadium oxydichloride, vanadium oxytrichloride, vanadium oxydifluoride, vanadium oxytrifluoride, vanadyl sulfate, vanadium dioxide, vanadium trioxide, vanadium tetraoxide, vanadium pentaoxide, vanadium nitrate, ammonium metavanadate, sodium vanadate, and sodium pyrovanadate.

The reaction of vanadium-containing component with an organophosphorus compound as described hereinabove to produce the compounds of the general Formulae I and II is accomplished by admixing the desired organophosphorus compound and vanadium-containing component in the desired ratio, e.g. 3 moles of organophosphorus component to 1 mole of vanadium-containing compound. The reactant vanadium-containing component is normally dissolved in an aqueous medium prior to introduction thereof into contact with the organophosphorus reactant. This aqueous solution is maintained at a pH of about 1 to 3 and preferably 1.5 by inclusion of a mineral acid, e.g. hydrochloric acid, therein. The molar ratio of vanadium-containing component therein is within the range of 3 to 5.

The organophosphorus reactant is dissolved in an organic solvent which latter component is inert under the conditions of reaction. Such organic solvents are, for example, liquid hydrocarbons such as aromatic and saturated aliphatic hydrocarbons, that is aryl, alkylaryl, arylalkyl and alkyl compounds, and specifically, by way of illustration, toluene, xylene, benzene, isooctane, and the like. The volume of this organophosphorus containing solution is desirably equivalent to that of the aqueous vanadium-containing solution. The aqueous vanadium-containing solution and organophosphorus containing hydrocarbon solvent are admixed, desirably, for several hours at a temperature within the range normally of 20° C. to 85° C. to cause the formation of the products of the invention. Isolation of the deisred products is had employing standard techniques. Thus, after sustained and vigorous mixing as alluded to above, the immiscible mixture is permitted to form organic and aqueous layers, which are then separated and the organic layer washed with neutral water solutions until the wash water pH is above 6.0. The washed organic layer is then filtered, for example, through diatomaceous earth. The solvent can be removed by distillation under vacuum. The products, organophosphorus-vanadium compounds of the general formulae, are normally stable, clear, colored, slightly viscous liquids. Both the acid aqueous layer and recovered organic distillate may be reused for preparation of further products.

To improve the interchange and contact of the reactants in the organic and aqueous layers, trialkyl phosphine oxides and/or trialkyl phosphates are desirably added to the organic layer. These oxides and phosphates contain alkyl substituents normally within the range of 1 to 10 carbon atoms, e.g. triethyl phosphine oxide, trioctyl phosphine oxide, tributyl phosphate, trioctyl phosphate, and the like.

Representative reactions within the purview of the present invention include:

The preparation of the organophosphorus-vanadium compound of the formula:

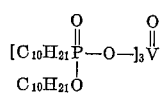

which results from the admixture of decyl-decylphosphonic acid and vanadium pentoxide in a mole ratio of 6:1 respectively.

The preparation of the organophosphorus-vanadium compound of the formula:

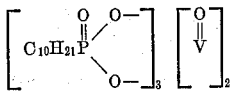

that comprises reacting in a mole ratio of 6:2, respectively, decylphosphonic acid and vanadium pentoxide.

The preparation of the compound:

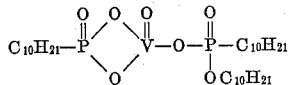

from 2 moles of decylphosphonic acid, 2 moles decyldecylphosphonic acid and one mole of vanadium pentoxide.

The preparation of the compound:

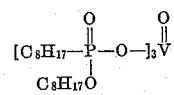

by reaction in a mole ratio of 6:1 respectively, of di-(2-ethylhexyl)-phosphonic acid and vanadium pentoxide.

The preparation of the compound of the formula:

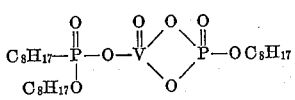

by reaction of di-(2-ethylhexyl) phosphonic acid, 2-ethylhexyl phosphoric acid and vanadium pentoxide in 2:2:1 molar proportions.

Preparation of the organophosphorus-vanadium compound of the formula:

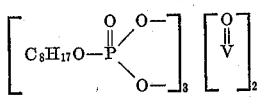

by reaction in a proportion of 3 mols of 2-ethylhexyl phosphoric acid to 1 mol of vanadium pentoxide.

Preparation of the compound of the formula:

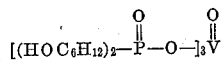

by reaction of di(hydroxymethylpentyl) phosphinic acid and vanadium pentoxide in a mol ratio of 6 to 1 respectively.

Similarly, coordination compounds of the formulae:

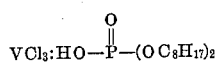

and

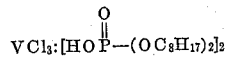

are prepared by reaction of a ratio of 1 mol of vanadium trichloride to 1 and 2 mols respectively of di-(2-ethylhexyl) phosphoric acid.

The vanadium-phosphorus compounds prepared as described herein provide hydrocarbon-soluble materials which are effective motor fuel additives. These compounds are stable to oxidation; are water-insoluble and therefore cannot be extracted with water; are stable to pyrolysis and hydrolysis and are non-corrosive. The phosphorus component of these compounds is adapted by the unique structure and proportions thereof to complex with the vanadium pentoxide formed in the combustion chamber of an internal combustion engine to form high-melting stable solids which are non-corrosive and are expelled with the exhaust gases; and which react with the carbon-lead solid residues of the petroleum fuels present in the combustion chamber to fire-proof these materials and to assist in the scavenging of these compounds. Additionally, the use of readily available and low cost sources of phosphorus (e.g. organophosphorus compounds prepared from phosphorus pentoxide and hypophosphorus acid and oxo-produced alcohols and aldehydes) and vanadium (e.g. acid red cake or ammonium metavanadate) coupled with relatively simple and highly efficient preparative procedures results in low treatment costs for fuels containing the novel compounds herein described.

Further, the phosphorus-vanadium compounds when added to hydrocarbon fuels, such as gasoline, are completely soluble in the amounts normally required to effect the desired improvement in engine performance. These compounds are stable in contact with the other normal fuel additives; do not exhibit lead antagonism; cause no loss in octane number; and do not precipitate on standing.

The compounds of the invention, when used as fuel additives, are introduced into the engine fuel and dissolves therein. The concentration of additive in gasoline for use in internal combustion engines is preferably about 1.5 grams of additive per gallon of gasoline fuel. Amounts of as little as 0.10 gram per gallon of gasoline and as much as 10.0 grams per gallon also constitute effective concentrations.

The following examples are further illustrative of the invention.

*Example 1*

To 300.5 grams of water in a 1,000 ml. heated flask equipped with a stirrer and reflux condenser is added 20.0 grams 37 percent hydrochloric acid and 9.8 grams of acid red cake (4.9 gr. vanadium). In a separate beaker, 28.1 grams of di(1-hydroxy-2-methylpentyl) phosphinic acid and 63.5 grams of di(2-ethylhexyl) phosphoric acid are dissolved in 300.5 grams of toluene. The toluene solution is added to the aqueous solution, and the agitated mixture is heated to 84° C. (the boiling point of the toluene-water azeotrope) and held for two hours at this temperature. The agitator is stopped and the mixture is poured into a separatory funnel where a clean, two-layer separation occurs. The lower aqueous layer is removed and the organic layer is washed twice with an equal volume of water, and filtered through diatomaceous earth. The filtered organic material is distilled under vacuum to remove the solvent leaving a clear, pale green, slightly viscous liquid. Yield 97.4 grams.

*Analysis.*—Vanadium calculated: 5.0%. Found: 4.50. Phosphorus calculated: 9.6. Found: 6.35.

This liquid is added to leaded gasoline (Esso Extra, trade name) to give a 5 percent solution of vanadium-phosphorus compound in gasoline. The solution is readily effected by hand stirring and a clear, stable solution results. On standing for ninety days in sunlight, no precipitate and no change in color or other solution characteristics is noted. The compound is then tested for its effect on research and motor octane number of leaded gasoline using standard procedures. At a treatment level of 1.5 cc. per gallon, no noticeable effect on octane number is observed.

*Example 2*

The procedure of Example 1 is repeated employing the following ingredients:

Acid red cake (vanadium content 50.15%), 5.4 grams (0.3 mol.)
37% hydrochloric acid solution, 60 grams
Di(hydroxymethylpentyl) phosphinic acid (molecular weight (M.W.) 266), 40.0 grams
Organic solvent: Toluene, 150 gr.
Aqueous solvent: Water, 150 gr.

Following the aforesaid procedure of Example 1, the acid red cake is dissolved in the acid aqueous solution; the di(hydroxymethylpentyl) phosphinic acid is dissolved in toluene. The two phases are then contacted for 24 hours under heat and agitation and separated. The organic solvent (toluene) is removed under vacuum distillation. Yield: 53.3 grams of clear, pale yellow liquid.

*Analysis.*—Vanadium calculated: 5.9. Found: 4.22. Phosphorus calculated: 10.8. Found: 8.32.

The product is then dissolved in leaded gasoline and tested in the manner described in Example 1. The results of these tests are identical to those found in Example 1.

*Example 3*

The procedure of Example 1 is again repeated employing the following formulation:

Vanadium trichloride (M.W. 157.3), 95% purity: 2.8 grams (0.018 mol.)
Trioctyl phosphine oxide (M.W. 386.6): 7.0 grams (0.018 mol.)
Di-(2-ethylhexyl) phosphoric acid (M.W. 322.4): 23.2 grams (0.072 mol.)
Organic solvent: Toluene, 150 grams
Aqueous solvent: Water, 150 grams A yield of 31.8 grams of a clear, green product was obtained.

*Analysis.*—Vanadium calculated : 2.65%. Found: 2.57%. Phosphorus calculated: 8.77%. Found: 8.62%.

This product is then tested in a 1959 Oldsmobile Super 88 engine in the following way: a premium gasoline fuel is completely consumed therein and the fuel tank drained. Ten gallons of regular grade leaded gasoline, into which 0.50 gram per gallon of the reaction product is introduced, is then placed in the tank and the car driven twenty miles on level grade. Test results similar to those of Example 1 are obtained.

*Example 4*

The procedure of Example 1 is again repeated employing the following formulation:

Vanadium trichloride (M.W. 157.3): 31.4 grams (0.2 mol.)
Di-(2-ethylhexyl) phosphoric acid (M.W. 322.4): 128.8 grams (0.4 mol.)
Trioctyl phosphine oxide (M.W. 386.6): 7.7 grams (0.02 mol.)
Water: 1500 ml.
Toluene: 1500 ml.

The procedure of the previous example is followed with the exception that extractions are carried out at room temperature and 200 grams of salt is added to the mixture at the end of 1.5 hours contact between the aqueous and organic phases. Total contact time is 2.5 hours. 132 grams of a dark green, clear solution is obtained.

*Analysis.*—Vanadium calculated: 7.7%. Found: 3.1%. Phosphorus calculated: 9.8%. Found: 9.3%.

This product is then tested as in Example 1.

*Example 5*

The procedure of Example 1 is employed using the following materials:

Decyl-decyl phosphonic acid $(C_{10}H_{21})(C_{10}H_{21}O)POOH$ (M.W. 362): 362 gr.
Acid red cake (50.15% vanadium). 31 gr.
Toluene: 600 gr.
Hydrochloric acid, 37%: 100 gr.
Water: 500 gr.

The product recovered is a black liquid weighing 459 grams of which 383 grams are vanadium-phosphorus compound and 76 grams are toluene.

*Analysis.*—Vanadium calculated: 3.72%. Found: 3.70%. Phosphorus calculated: 6.76%. Found: 6.63%.

*Example 6*

The procedure of Example 1 is again repeated employing the following formulation:

| | Gr. |
|---|---|
| Decyl phosphonic acid (M.W.: 222) | 44.4 |
| Red cake | 14.4 |
| Toluene | 150.0 |
| Water | 100.0 |
| Concentrated hydrochloric acid | 40.0 |

The product recovered is a dark green solution weighing 83 grams which contains 55% of the product vanadium-phosphorus complex and 45% toluene.

*Analysis.*—Vanadium calculated: 7.05%. Found: 7.00%. Phosphorus calculated. 6.45%. Found: 6.35%.

*Example 7*

The procedure of Example 1 is repeated employing the following materials:

| | Gr. |
|---|---|
| Hexylhexyl phosphonic acid (M.W. 250.2) $(C_6H_{13})(C_6H_{13}O)POOH$ | 250 |
| Acid red cake (50.15% vanadium) | 31 |
| Toluene and dilute hydrochloric acid, each | 600 |

The product recovered is 350 grams of a brown liquid which consists of 272 grams of phosphorus-vanadium compound and 78 grams toluene.

*Analysis.*—Vanadium calculated: 4.82%. Found: 4.86%. Phosphorus calculated: 8.86%. Found: 9.02%.

*Example 8*

The procedure of Example 1 is repeated using the following quantities of materials:

| | Gr. |
|---|---|
| Hexyl phosphonic acid (M.W. 166.1) | 166 |
| Acid red cake (50.15% vanadium) | 62 |
| Toluene and dilute hydrochloric acid, each | 600 |

A total of 290 grams of green-black liquid product is recovered which contains 209 grams of vanadium-phosphorus compound and 81 grams of toluene.

*Analysis.*—Vanadium calculated: 10.7%. Found 10.3%. Phosphorus calculated: 11.7%. Found: 11.2%.

*Example 9*

The procedure of Example 1 is repeated using the following materials:

| | Gr. |
|---|---|
| Cyclohexylbutyl phosphonic acid (M.W. 220.2) | 220 |
| Acid red cake (50.15% vanadium) | 31 |
| Toluene and dilute hydrochloric acid, each | 600 |

A total of 444 grams of a dark-brown liquid containing 242 grams of vanadium-phosphorus compound and 202 grams of toluene are recovered as product:

*Analysis.*—Vanadium calculated: 3.1%. Found: 3.0%. Phosphorus calculated: 5.7%. Found: 5.65%.

*Example 10*

The procedure of Example 1 is repeated using the following materials:

| | Gr. |
|---|---|
| Cyclohexyl phosphonic acid (M.W. 164.1) | 164 |
| Acid red cake (50.15% vanadium) | 62 |
| Toluene and dilute hydrochloric acid, each | 600 |

A total of 378 grams of green-black liquid product is obtained containing 208 grams of vanadium-phosphorus compound and 170 grams of toluene.

*Analysis.*—Vanadium calculated: 8.3%. Found: 7.95%. Phosphorus calculated: 12.5%. Found: 12.62%.

Example 11

The procedure of Example 1 is repeated using the following materials:

| | Gr. |
|---|---|
| 2-ethylhexyl, 2-ethylhexyl phosphonic acid (M.W. 306.3) | 306 |
| Acid red cake (50.15% vanadium) | 31 |
| Toluene and dilute hydrochloric acid, each | 600 |

The product recovered is a dark brown-green liquid weighing 769 grams and containing 329 grams of vanadium-phosphorus compound and 440 grams of toluene.

*Analysis.*—Vanadium calculated: 2.23%. Found: 2.20%. Phosphorus calculated: 4.10%. Found: 4.02%.

Example 12

The procedure of Example 1 is repeated using the following materials:

| | Gr. |
|---|---|
| 2-ethylhexyl phosphonic acid (M.W. 194.2) | 194 |
| Acid red cake (50.15% vanadium) | 62 |
| Toluene and dilute hydrochloric acid, each | 600 |

A dark brown liquid product weighing 552 grams is recovered containing 237 grams of vanadium-phosphorus compound and 315 grams of toluene.

*Analysis.*—Vanadium calculated: 6.15%. Found: 6.02%. Phosphorus calculated: 5.64%. Found: 5.38%.

The organophosphorus-vanadium additives of the invention are also useful as diesel fuel additives to increase the octane number. They are, in addition, combustion improvers for fuel oils other than merely those employed in internal combustion engines, and, for example, are used efficaciously in industrial and domestic furnaces and other combustion apparatus.

What is claimed is:

1. A chemical compound of the formula:

$$R'-\overset{O}{\underset{\phantom{O}}{P}}\overset{O}{\underset{O}{\diagup}}\overset{\phantom{O}}{\underset{\phantom{O}}{V}}-O-\overset{O}{\underset{OR'}{P}}-R'$$

wherein $R'$ is an alkyl radical containing from 1 to 16 carbon atoms.

2. A chemical compound of the formula:

$$R'-\overset{O}{P}\overset{O}{\diagup}\overset{\phantom{O}}{V}-O-\overset{O}{P}-O-\overset{\phantom{O}}{V}\overset{O}{\diagdown}\overset{O}{P}-R'$$

wherein $R'$ is an alkyl radical containing from 1 to 16 carbon atoms.

3. A chemical compound of the formula:

$$[R'-\overset{O}{\underset{OR'}{P}}-O]_3 V$$

wherein $R'$ is an alkyl radical containing from 1 to 16 carbon atoms.

4. A chemical compound of the formula:

$$[(HOR')_2-\overset{O}{P}-O-]_r V[-O-\overset{O}{\underset{H}{P}}-R'OH]_{3-r}$$

wherein $R'$ is an alkyl radical containing from 1 to 16 carbon atoms and $r$ has a value of from 0 to 3.

5. A chemical compound of the formula:

$$\left[ R'O-\overset{O}{P}\overset{O-}{\diagdown_{O-}} \right]_3 \left[ \overset{O}{\underset{\phantom{O}}{V}} \right]_2$$

wherein $R'$ is an alkyl radical containing from 1 to 16 carbon atoms.

6. A chemical compound of the formula:

$$R'O-\overset{O}{P}\overset{O}{\diagup}\overset{\phantom{O}}{V}-O\overset{O}{P}-(OR')_2$$

wherein $R'$ is an alkyl radical containing from 1 to 16 carbon atoms.

7. A chemical compound of the formula:

$$VCl_3 \cdot \left( HO\overset{O}{\underset{OR'}{\overset{OR'}{P}}} \right)_q$$

wherein $R'$ is an alkyl radical containing from 1 to 16 carbon atoms and $q$ is an integer from 1 to 2.

8. A chemical compound of the formula:

$$VCl_3 \cdot [O=P(OR')_3]_q$$

wherein $R'$ is an alkyl radical containing from 1 to 16 carbon atoms and $q$ is an integer of from 1 to 2.

9. A chemical compound of the formula:

$$VCl_3 \cdot [HO-\overset{O}{\underset{\phantom{O}}{P}}-R_2']_q$$

wherein $R'$ is an alkyl radical containing from 1 to 16 carbon atoms and $q$ has a value of from 1 to 2.

10. A chemical compound of the formula:

$$VCl_2 : [HO-\overset{O}{\underset{\phantom{O}}{P}}-(OR')_2]_k$$

wherein $R'$ is an alkyl radical containing from 1 to 16 carbon atoms and $k$ is an integer of from 1 to 3.

11. A chemical compound of the formula:

$$VCl_2 : \left[ \overset{O}{\underset{\phantom{O}}{P}}(OR')_3 \right]_k$$

wherein $R'$ is an alkyl radical containing from 1 to 16 carbon atoms and $k$ is an integer of from 1 to 3.

12. A chemical compound of the formula:

$$VCl_2 : [HO\overset{O}{\underset{\phantom{O}}{P}}R_2']_k$$

wherein $R'$ is an alkyl radical containing from 1 to 16 carbon atoms and $k$ is an integer of from 1 to 3.

13. The vanadium pentoxide-decyl phosphonic acid reaction product of the formula:

$$[C_{10}H_{21}-\overset{O}{\underset{C_{10}H_{21}-O}{P}}-O-]_3 V$$

14. The vanadium pentoxide-decyl phosphonic acid reaction product of the formula:

$$\left[ C_{10}H_{21}\overset{O}{P}\overset{O-}{\diagdown_{O-}} \right]_3 \left[ \overset{O}{\underset{\phantom{O}}{V}} \right]_2$$

15. The vanadium pentoxide-decyl phosphonic acid reaction product of the formula:

$$C_{10}H_{21}-\overset{O}{P}\overset{O}{\diagup}\overset{\phantom{O}}{V}-O-\overset{O}{\underset{O-C_{10}H_{21}}{P}}-C_{10}H_{21}$$

16. The vanadium pentoxide 2-ethylhexyl phosphoric acid reaction product of the formula:

$$(C_8H_{17}O)_2-\overset{O}{P}-O\overset{O}{V}\overset{O}{\diagdown}\overset{O}{P}-OC_8H_{17}$$

17. The vanadium pentoxide 2-ethylhexyl phosphoric acid reaction product of the formula:

$$\left[ C_8H_{17}O\overset{O}{P}\overset{O-}{\diagdown_{O-}} \right]_3 \left[ \overset{O}{\underset{\phantom{O}}{V}} \right]_2$$

18. The vanadium pentoxide - di - (hydroxymethylpentyl) phosphinic acid reaction product of the formula:

$$[(HOC_6H_{12})_2-\overset{O}{P}-O-]_3 V$$

19. The chemical compound, vanadium trichloride-di-2-ethylhexyl phosphoric acid of the formula:

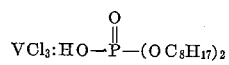

20. The chemical compound, vanadium trichloride-di-[(di-2-ethylhexyl)phosphoric acid] of the formula:

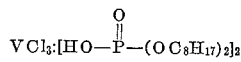

21. Process for preparing the organophosphorus-vanadium compound of the formula:

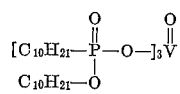

that comprises reacting in a mole ratio of 1:6, respectively, vanadium pentoxide and decyl decyl phosphonic acid.

22. Process for preparing the organophosphorus-vanadium compound of the formula:

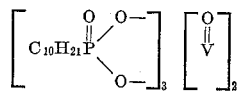

that comprises reacting in a mol ratio of 3:1, respectively, decyl phosphonic acid and vanadium pentoxide.

23. Process for preparing the organophosphorus-vanadium compound of the formula:

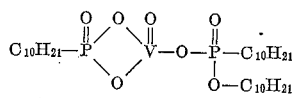

that comprises reacting 2 moles of decyl phosphonic acid, 2 moles of decyl decyl phosphonic acid and one mole of vanadium pentoxide.

24. Process for the preparation of the organo-phosphorus compound:

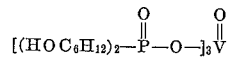

that comprises reacting, in a mol ratio of 6:1 respectively, di-(hydroxymethylpentyl)-phosphinic acid and vanadium pentoxide.

25. Process for the preparation of the organophosphorus compound:

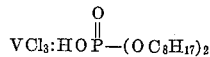

that comprises reacting in a mol ratio of 1:1 respectively, di-(2-ethylhexyl) phosphoric acid and vanadium trichloride.

26. Process for the preparation of the organophosphorus compound:

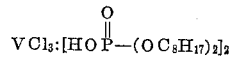

that comprises reacting in a mol ratio of 2:1 respectively, di-(2-ethylhexyl) phosphoric acid and vanadium trichloride.

References Cited by the Examiner
UNITED STATES PATENTS

| | | | |
|---|---|---|---|
| 2,409,774 | 10/1946 | Mack et al. | 260—435 |
| 2,742,351 | 4/1956 | Rogers et al. | 44—76 |
| 2,784,206 | 3/1957 | Chadick | 260—429 |
| 2,793,945 | 5/1957 | Walker et al. | 44—76 |
| 2,866,732 | 12/1958 | Hoff et al. | 260—429 X |
| 2,930,807 | 3/1960 | Case | 260—429 |
| 3,093,669 | 6/1963 | De Young | 260—429 |

TOBIAS E. LEVOW, *Primary Examiner.*

JULIUS GREENWALD, *Examiner.*

M. WEINBLATT, T. L. IAPALUCCI, A. DEMERS,
*Assistant Examiners.*